UNITED STATES PATENT OFFICE.

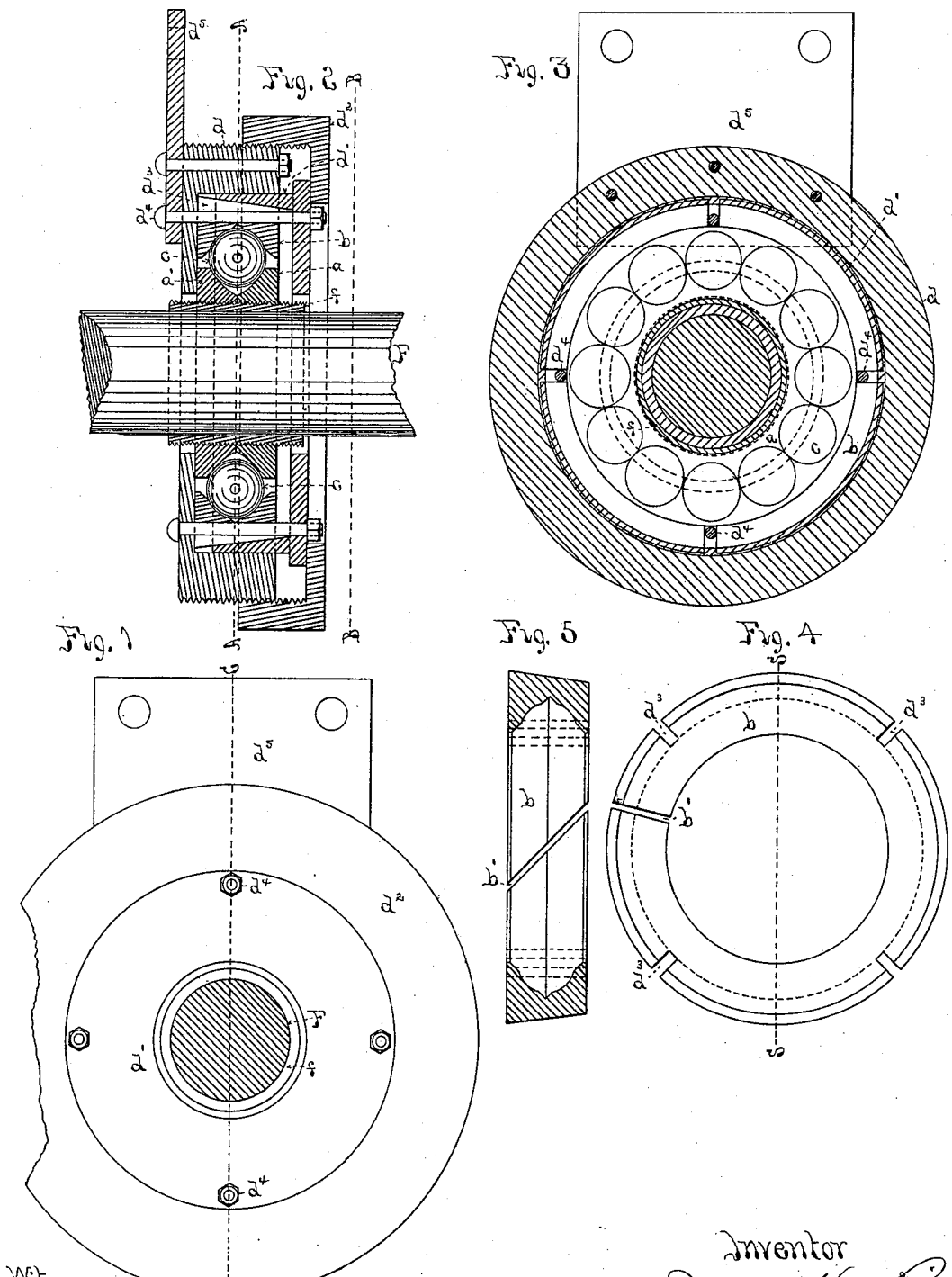

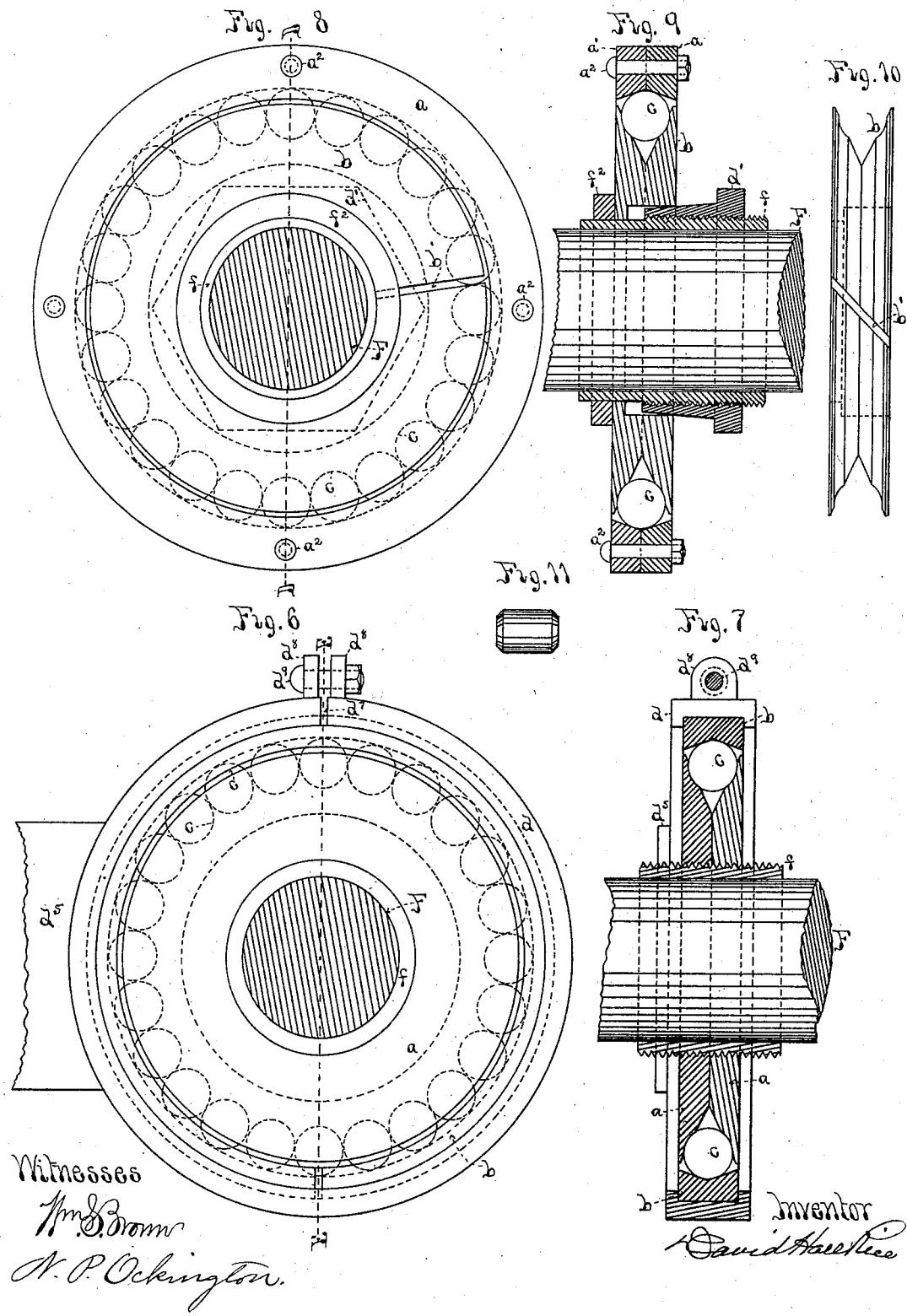

DAVID HALL RICE, OF LOWELL, MASSACHUSETTS.

BALL AND ROLLER BEARING FOR SHAFTS.

SPECIFICATION forming part of Letters Patent No. 321,053, dated June 30, 1885.

Application filed June 1, 1885. (No model.)

*To all whom it may concern:*

Be it known that I, DAVID HALL RICE, of Lowell, in the county of Middlesex and State of Massachusetts, have invented a new and useful Improvement in Ball and Roller Bearings for Shafts, of which the following is a specification.

My invention relates to ball and roller bearings for shafts; and it consists in certain improvements in the method of constructing the same, substantially as hereinafter described and claimed.

In the drawings, Figure 1 is a side view of a ball-bearing constructed according to my invention. Fig. 2 is a transverse section of the same on line C C of Fig. 1. Fig. 3 is a transverse section of the same in the opposite direction on the line A A of Fig. 2. Fig. 4 is a side view of one of the annular bearings removed. Fig. 5 is a transverse section of the same on the line S S of Fig. 4. Fig. 6 shows in side view a modification of the form shown in Fig. 1. Fig. 7 is a transverse section of Fig 6 on the line E E. Fig. 8 is a side view of another modification of the invention. Fig. 9 is a transverse section of Fig. 8 on the line D D. Fig. 10 is a side view of one of the ring-bearings of Fig. 8 removed. Fig. 11 is a view of a form of roller which may be used in place of the balls shown in the preceding modifications.

F is the shaft which is to be supported and revolves in the bearing. This shaft has an enlargement, $f$, secured upon it, on the exterior of which is cut a screw-thread. A collar is formed in two parts, $a$ $a'$, and with a V-shaped groove cut in its periphery large enough for the balls to roll in, and the two parts are screwed firmly against each other upon the enlargement $f$ after the balls are inserted into the bearing between them, as shown. Another collar, $b$, having a corresponding V-shaped groove around its internal face forms the bearing in the box for the balls $c$ $c$ to roll in. This latter collar is fitted to be closed to a greater or less degree around the balls by having a slot, $b'$, cut through it on one side, separating the ends formed on each side of the slot by a given space. By compression of the casing or holder around ring $b$ it will be reduced in diameter and take up the portion worn away by the balls from the sides of its V-shaped groove in use, and the bearing will be rendered adjustable. Instead, however, of cutting the slot $b'$ transversely across the face of this V-shaped groove, and substantially parallel to the axis of the shaft, as heretofore, I cut it across diagonally, as shown in Fig. 5, so as to bring one part of it into contact with the balls earlier or in advance of the other part. Instead of each ball, as it passes over the slot, dropping down into it, as would be the case if it crossed the path of the ball transversely, the part of the bearing-surface of the ball which first meets the slot bridges over that part of the latter, while the larger part of the entire ball-bearing surface (not having reached the slot) is sustained by the continuous surface of the V-shaped groove, and the ball cannot, therefore, drop into or be affected by the small part of the slot thus beneath it. As the ball rolls onward it continually brings a new portion of the slot $b'$ beneath it and as continually leaves a corresponding portion behind, and is thus always supported by so large an unbroken part of the V-shaped groove beneath it in proportion to the part of the slot it is passing over that it crosses the latter without any sensible jar or disturbance on that account. I thus provide an adjustable ball-bearing which has all the advantages of being closed radially inward to adjust it, and therefore always remains in exactly the same position upon the shaft F longitudinally without any disadvantage from the presence of the slot necessary to accomplish this cut across its surface. It is obvious that the slot $b'$ need not be cut exactly in a diagonal right line through the ring $b$ to accomplish this result, as it may consist of two diagonals joined, or of a series of short transverse parts connected by circumferential divisions of the ring which slide past or upon each other to close the space between the transverse parts of it in adjusting the bearing, it being only essential that it shall be arranged so that the ball shall pass over different parts of the slot successively, and be continually supported by the unbroken surface of the bearing part of the ring lying on one or both sides of the different parts of the slot, and thus preventing it from dropping down into the latter, as it would if the slot were cut square across the ring.

In order to provide means for compressing the ring $b$ in a true circle, which is important in a ball or roller bearing, I provide a holder for it as follows: The ring $b$ is placed in a collar, $d$, which has a screw-thread cut around its circumference and rests against a plate on one side of the latter, which extends radially inward past the outside of the ring $a$, and thus protects the bearing from dust and dirt. Outside the ring $b$, and between it and the inner circumference of the collar $d$, is inserted the tubular-shaped wedge $d'$, which also has a dust-protecting plate attached to its thickest end projecting radially inward. A sleeve-nut, $d^2$, has an annular flange projecting radially inward past the outer end of the wedge $d'$ and screws over the collar $d$. By screwing up the sleeve-nut $d^2$ the wedge $d'$ will be forced inward, and compress the ring $b$ around the balls.

In order to prevent the ring $b$ from turning in collar $d$, I cut four notches, $d^3$, in its periphery and pass the bolts $d^4$ through the collar and the flange-plate of wedge $d'$ and these slots; but these are chiefly useful before the ring $b$ is worn sufficiently to require much pressure upon wedge $d'$. An ear-piece, $d^5$, is secured by bolts to the collar $d$, and serves to attach it to any suitable fixed support.

Figs. 6 and 7 show another form of constructing collar $d$ to confine and compress slotted ring $b$. The collar $d$ is formed with a groove or channel all around its internal circumference fitted to receive and hold ring $b$, and has a slot, $d^7$, cut through one side of it, and an ear, $d^8$, on each side of the slot. Through these ears passes the screw-bolt $d^9$, provided with a head outside of one ear and a nut outside of the other, by screwing up which the collar $d$ is compressed upon the ring $b$ and the bearing is adjusted. The ring $b$ is inserted into collar $d$ by springing the latter open before the bolt $d^9$ is inserted in place.

Figs. 8, 9, and 10 show the application of my improvement to the inner V-faced ball-bearing ring instead of the outer one. In this construction $a$ $a'$ become the outer rings and are secured together by bolts $a^2$ $a^2$. The inner ring is provided with the diagonal slot $b'$ across the V-shaped groove in its outer circumference, and is placed around the shaft enlargement $f$, resting on one face against the collar $f^2$, shrunk onto the enlargement after the ring is put on. The tubular wedge $d'$ is made small enough to embrace the enlargement $f$, and is provided with an internal screw-thread to fit the latter, and its thinner end enters within a chamber formed in the inner circumference of collar $b$ and around the enlargement, as shown, to receive it, so that the outer surface of the wedge bears against the ring internally. By screwing up the wedge $d'$, (it being formed with a squared enlargement on its outer end to facilitate this,) it is forced within the ring $b$ and expands it against the balls.

It will be observed that the ball-bearing surfaces of the V-shaped grooves in the rings $a$, $a'$, and $b$ are rounded out slightly to fit the balls. The breadth of these rounded-out parts transversely in the ring $b$ should be greater than the breadth of the diagonal slot $b'$ in the same direction. This will effectually prevent the ball from being affected by the diagonal slots in passing over it.

Instead of round balls, rollers of cylinders— such as shown in Fig. 11—may be employed, the bearing-grooves of the rings $a$ $a'$ being made to conform to its shape and allow it to roll therein in the usual manner, and the diagonal slot $b'$ will operate the same with them.

What I claim as new and of my invention is—

1. In an adjustable ball or roller bearing, the ring $b$, provided with a bearing track or surface for the ball to traverse upon around its inner or outer circumference, and a dividing slot, $b'$, crossing said bearing-surface in a line or lines at an angle with relation to the axis of the shaft and adapted to bring the rolling ball into contact successively with its different parts transversely of the bearing-surface and mechanism for adjusting the size of said ring in said bearing, substantially as described.

2. The combination, in a ball-bearing, of the ring $b$, provided with the transverse slot $b'$, and forming the outer or inner ball-bearing surface, the opposite inner or outer ball-bearing surface, the series of balls between them, and the tubular wedge $d'$, adapted to bear upon said ring and move its bearing-surface nearer to the opposite one, substantially as described.

DAVID HALL RICE.

Witnesses:
WILLIAM P. BLAKE,
N. P. OCKINGTON.